(12) United States Patent
Julian (10) Patent No.: US 8,820,080 B2
(45) Date of Patent: Sep. 2, 2014

(54) NONFRACTIONALIZED BIOMASS-FUELED REFRIGERANT-BASED COGENERATION

(76) Inventor: Marvin Duane Julian, St. Helena Island, SC (US)

( * ) Notice: Subject to any disclaimer, the term of this patent is extended or adjusted under 35 U.S.C. 154(b) by 0 days.

(21) Appl. No.: 13/170,828

(22) Filed: Jun. 28, 2011

(65) Prior Publication Data

US 2011/0314816 A1 Dec. 29, 2011

Related U.S. Application Data

(60) Provisional application No. 61/359,199, filed on Jun. 28, 2010, provisional application No. 61/359,781, filed on Jun. 29, 2010.

(51) Int. Cl.
*F01K 25/08* (2006.01)
*C10J 3/34* (2006.01)
*F01K 25/10* (2006.01)

(52) U.S. Cl.
CPC . *F01K 25/10* (2013.01); *Y02E 20/14* (2013.01)
USPC ........................................ 60/651; 110/165 R (58) Field of Classification Search
USPC ............ 60/645–681; 110/110, 346, 229, 259, 110/165 R
See application file for complete search history.

(56) References Cited

U.S. PATENT DOCUMENTS

| 3,795,103 | A  | * | 3/1974  | Anderson ........................ | 60/651  |
|-----------|----|---|---------|----------------------------------|---------|
| 5,252,107 | A  | * | 10/1993 | Wilkins, Jr. ..................... | 44/603  |
| 5,917,138 | A  | * | 6/1999  | Taylor ............................... | 96/61   |
| 2008/0041357 | A1 | * | 2/2008 | Brown ........................... | 126/77  |
| 2009/0056333 | A1 | * | 3/2009 | Schwiegel et al. ............. | 60/671  |
| 2009/0165459 | A1 | * | 7/2009 | Henriksen et al. ............. | 60/645  |
| 2009/0183693 | A1 | * | 7/2009 | Furman ........................ | 122/16.1 |
| 2010/0018207 | A1 | * | 1/2010 | Juchymenko ................. | 60/670  |
| 2010/0018228 | A1 | * | 1/2010 | Flammang et al. ............. | 62/115  |

FOREIGN PATENT DOCUMENTS

WO    WO 2011053652 A1 *  5/2011

* cited by examiner

*Primary Examiner* — Christopher Jetton
*Assistant Examiner* — Brian Inacay (57) ABSTRACT

A system and method for cogeneration of electricity and useful heat utilizing non-fractionalized biomass as a fuel whose combustion in thermal proximity to a heat transfer medium, preferably water, is used to drive an organic Rankine Cycle which generates mechanical power for driving an electrical generator, and from which useful heat is captured and may be used for any of a myriad of purposes.

12 Claims, 7 Drawing Sheets

NONFRACTIONALIZED BIOMASS-FUELED REFRIGERANT-BASED COGENERATION

CROSS-REFERENCE TO RELATED APPLICATIONS

This application claims priority under 35 U.S.C. §119(e) to U.S. Provisional Patent Application Ser. No. 61/359,199 filed Jun. 28, 2010 entitled "Biomass-Fueled Refrigerant Based Electricity Generation" and to U.S. Provisional Patent Application Ser. No. 61/359,781 filed Jun. 29, 2010 and entitled "Biomass-Fueled Refrigerant Based Electricity Generation".

STATEMENT REGARDING FEDERALLY SPONSORED-RESEARCH OR DEVELOPMENT

Not Applicable. The Statement Regarding Federally Sponsored Research or Development previously set forth in unpublished U.S. Provisional Patent Application Ser. No. 61/359,781 was made in error and his hereby withdrawn.

INCORPORATION BY REFERENCE

U.S. Provisional Patent Application Ser. No. 61/359,199 filed Jun. 28, 2010 entitled "Biomass-Fueled Refrigerant Based Electricity Generation" and U.S. Provisional Patent Application Ser. No. 61/359,781 filed Jun. 29, 2010 entitled "Biomass-Fueled Refrigerant Based Electricity Generation" are each expressly incorporated herein by reference in their entireties to form a part of this application. Also expressly incorporated herein by reference in its entirety to fowl a part of this application is the application for United States Department of Agriculture (USDA), Rural Energy for America Program (REAP) Grant #46-007-592690826 (currently unfunded), submitted Jun. 29, 2009 and formally approved on Sep. 23, 2009.

FIELD OF THE INVENTION

The invention relates to the field of cogeneration of electricity and heat. More particularly, the present invention relates to a biomass-fueled, refrigerant-based Organic Rankine Cycle cogeneration system and method for generating electrical energy in the form of alternating current (a.c.) electrical energy at the line frequency of a local power grid, and for recovering and distributing useful excess thermal energy derived from combustion of a biomass fuel in indirect thermal communication with an organic refrigerant whose expansion in an Organic Rankine Cycle drives a turbine, micro turbine, generator, screw expander or other device which is mechanically coupled to an electrical generator.

BACKGROUND OF THE INVENTION

Cogeneration refers to the generation of both electricity and useful heat. In the prior art, it has been known to employ a thermodynamic cycle, including the particular type known as a closed loop Organic Rankine Cycle (ORC) to carry out cogeneration using energy provided by the combustion of a fuel.

In a closed loop Rankine cycle, a working fluid follows a closed loop path through which it is continuously recycled. In an Organic Rankine Cycle, the working fluid is an organic fluid such as n-pentane or toluene. An Organic Rankine Cycle may be described as a recurring cycle of four constituent processes. In one process, working fluid is pumped from a low pressure to a high-pressure. In a second process, the liquid working fluid is heated to become a vapor at substantially constant pressure. In a third process, the vapor is expanded through a turbine which is coupled to a generator to generate power while concomitantly decreasing its temperature and pressure. In a fourth process, the vapor is condensed to become a liquid.

For example U.S. Pat. No. 5,704,209 to Bronicke et al. discloses an externally fired combined cycle gas turbine system having a compressor for compressing ambient air, a water heat exchanger for heating the compressed air, an air turbine for expanding the heated compressed air in the generator connected to the turbine for generating electricity. The system also includes a source of energy such as solar energy, oil shale, solid waste fuel, landfill gas, biomass or combinations thereof and/or hydrocarbon fuels for adding heat to the compressed air in the air heat exchanger and producing heat depleted gases exiting the heat exchanger. The system further includes a closed Rankine cycle power plant having a water heat exchanger for vaporizing water and producing steam using heat contained in the heat depleted gases and steam turbine for expanding the steam and producing power and expanded steam.

U.S. Pat. No. 7,882,692 to Pronske et al. discloses a fuel combustion power generation system operating as a closed Rankine cycle with a working fluid that is externally heated by combustion of fuel in the presence of oxygen in a combustor. Products of the combustion, typically including steam and $CO_2$, are routed through a high temperature side of a heat exchanger through whose low temperature side passes the working fluid of the closed Rankine cycle. The working fluid is passed on to a turbine, or other expander, which in turn is coupled to a generator for a.c. electrical power generation. The fuel may be gaseous fuel or a solid or liquid fuel, such as coal or biomass, but gasification before combustion is disclosed.

Maxxtec AG of Sinsheim, Germany offers organic Rankine cycle modules in which combustion of biomass produces combustion gases at temperatures of approximately 950° C. which, via a heat exchanger, heats thermal oil to a temperature of 300° C. to 330° C. A secondary circuit having a second heat exchanger uses the thermal oil to heat organic fluid for the organic Rankine cycle. The heated organic fluid is evaporated in a turbine and drives the turbine to generate electricity by way of a generator to which the turbine is mechanically coupled. Water cooled condenser(s) condense the organic vapor and heated cooling water is available for use for various heating applications such as heating dryers or hot water heating systems. Although solid wood biomass may be used as fuel, such must be chipped, shredded or otherwise fractionalized into small, substantially uniform pieces prior to combustion.

SUMMARY OF THE INVENTION

The invention relates to a biomass-fueled, refrigerant-based cogeneration system and method that provides for the simple and economical conversion of carbonaceous biomass resources, such as for example, solid wood, into useful alternating current (a.c.) electricity and heat through use of an Organic Rankine Cycle (ORC) which uses as a working fluid a commercially available organic refrigerant such as non-flammable, environmentally-friendly, Genertron® R245FA available from Honeywell International, Inc. The invention can suit a variety of applications, and is particularly well suited to situations where the cost and energy expenditure of transport of fuel over substantial distances and/or the cost and energy expenditure of fractionalizing (e.g. chipping or shredding) biomass into a suitable fuel would render conventional cogeneration systems and methods economically nonviable. The system and method of the invention does not require the added cost, labor or expense of wood chipping or shredding thus eliminating further inefficiencies, costs and pollution emissions associated with the operation of chipping, shredding and/or drying equipment needed in the prior art. The invention has the added benefit of being capable of consuming stumps, logs, tree limbs and other wood debris of types not currently economically employable for other productive uses. Further, its locatability close to the source of such biomass provides the added benefit of substantially lower power line losses.

According to a preferred embodiment, water is circulated through the heat exchanger of a hydronic unit wherein energy generated by combustion of solid virgin woody biomass in the burn box of the hydronic unit is used to generate hot water. Such hot water is then pumped from the hydronic unit into an expansion heat exchanger where its heat energy is transferred to the refrigerant, thus expanding the refrigerant, whereupon the water is then circulated back to the hydronic unit. The heated pressurized refrigerant vapor passes into a turbine, micro turbine, gerotor, screw expander of other positive displacement mechanical device which allows it to expand, and drop in pressure and temperature to produce mechanical power that is used to rotate a generator to produce a.c. electrical power.

The refrigerant vapor discharged from the turbine or other positive displacement mechanical device passes into a condensing heat exchanger where it cools further and condenses into a liquid state before being returned to a refrigerant storage vessel from which it may then be pumped back into the expansion heat exchanger. The condensing heat exchanger is supplied with cooling water from a source such as an extraction well. During passage through the condensing heat exchanger, the refrigerant's heat is rejected to such cooling water thus increasing such waters temperature. Useful heat may then be extracted from the increased temperature condensing water for a myriad of useful purposes such as drying biomass feedstock or other materials, hydroponic agricultural use, greenhouse, commercial and/or residential heating, clothes drying, water heating, water pre-heating and/or other heating applications and/or combined heat and power applications. After whatever remedial treatment, if any, which might be needed depending on the use made of the cooling water in order to restore the water to appropriate standards, the cooling water may be discharged into a terrestrial body of water or injected into the earth via an injection well.

According to a further optional step, the biomass may be enriched or supplemented with a petroleum-based combustible prior to combustion. The petroleum-based combustible may comprise or consist of recovered oil well spillage which has been recovered from an oil spill and which, if required, has been sufficiently de-watered to allow satisfactory combustion. De-watering may be carried out through filtration and/or by centrifuging and/or gravity separation.

Embodiments of the present invention may generate power for operating single phase and/or three phase electrical generators for on-site use, peak shaving, base load and/or distributed power generation as well as other of electricity generating devices and/or equipment, either separately or in addition to multi-purpose mechanical energy. Embodiments of the present invention also extract heat from increased temperature condensing water. This rejected heat may beneficially be employed for any of a myriad of uses such as, by way of non-limiting example, those mentioned further above.

The system may be deployed in a variety of situations where the disposal cost and/or BTU value of biomass resources render deployment ecologically and/or economically viable. Such situations exist inter alia where biomass resources are underutilized or are disposed of unproductively as waste. Examples of operations that may provide suitable fuel sources for embodiments of the present invention include, but are not limited to: land clearing, natural disaster biomass removal and/or disposal, tree pruning and/or removal; logging and timbering operations, sawmill operations and/or biomass energy crop production such as hybrid Poplar tree plantations. Hence, such commonly wasted solid wood biomass may be used for renewable electricity generation in an innovative manner requiring no chipping, shredding, grinding, pelletizing or other fractionalizing. As used herein the term "non-fractionalized" means not requiring reduction in size or volume of individual pieces of biomass beyond the extent, if any, as may be needed in order to allow the pieces to be fed into the burn box of the hydronic unit used and fit in the burn box with the burn box closed.

These and other objects and advantages of the present invention will become apparent to a person of ordinary skill in the art upon review of the following written description of preferred embodiments taken in conjunction with the following drawings wherein like reference numerals designate like items and wherein:

DETAILED DESCRIPTION OF PREFERRED EMBODIMENTS

Figure 1:
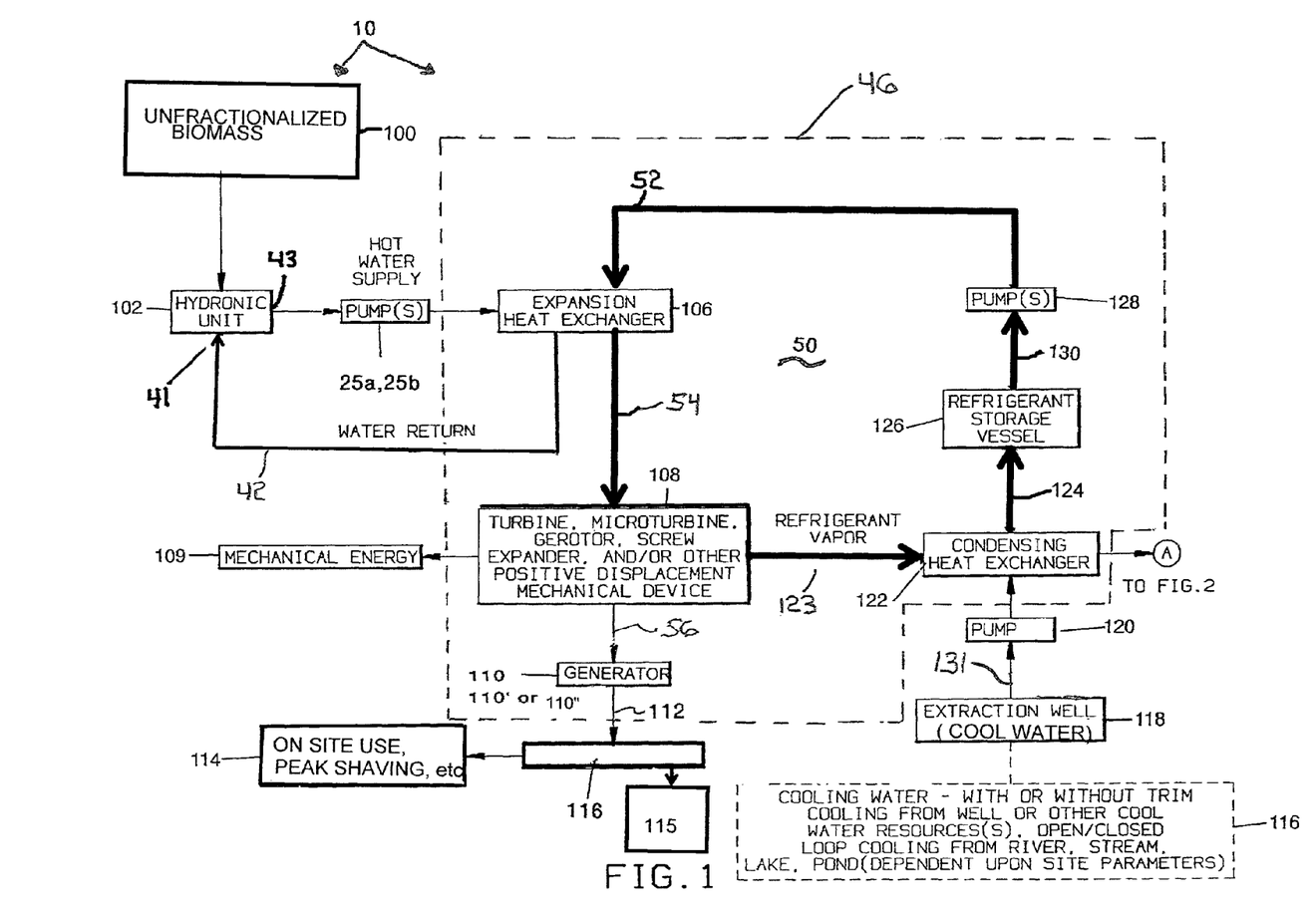
FIG. 1 shows a first part of a schematic diagram in accordance with an embodiment of the present invention.
Figure 2:
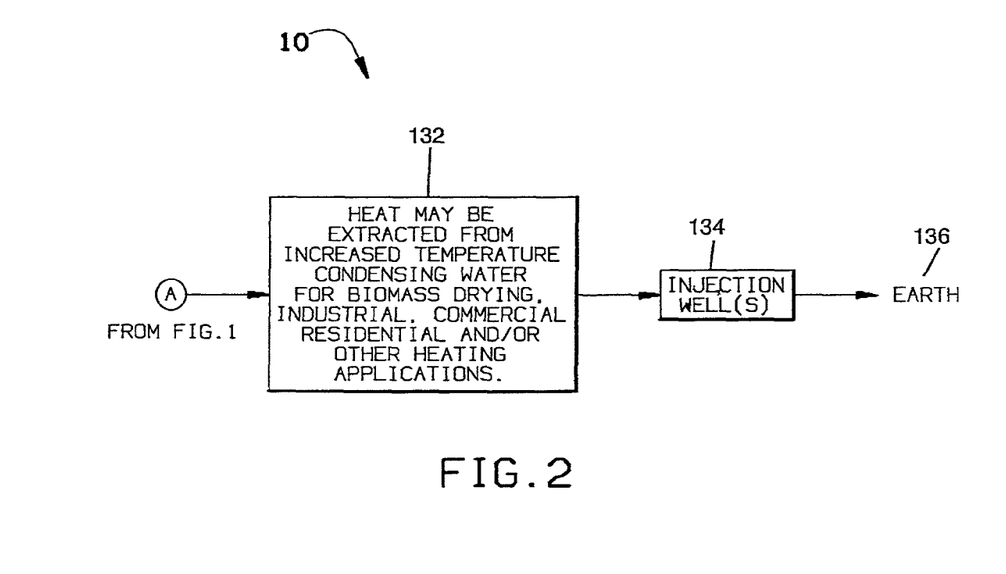
FIG. 2 shows a second part of the schematic diagram of FIG. 1.
Figure 3:
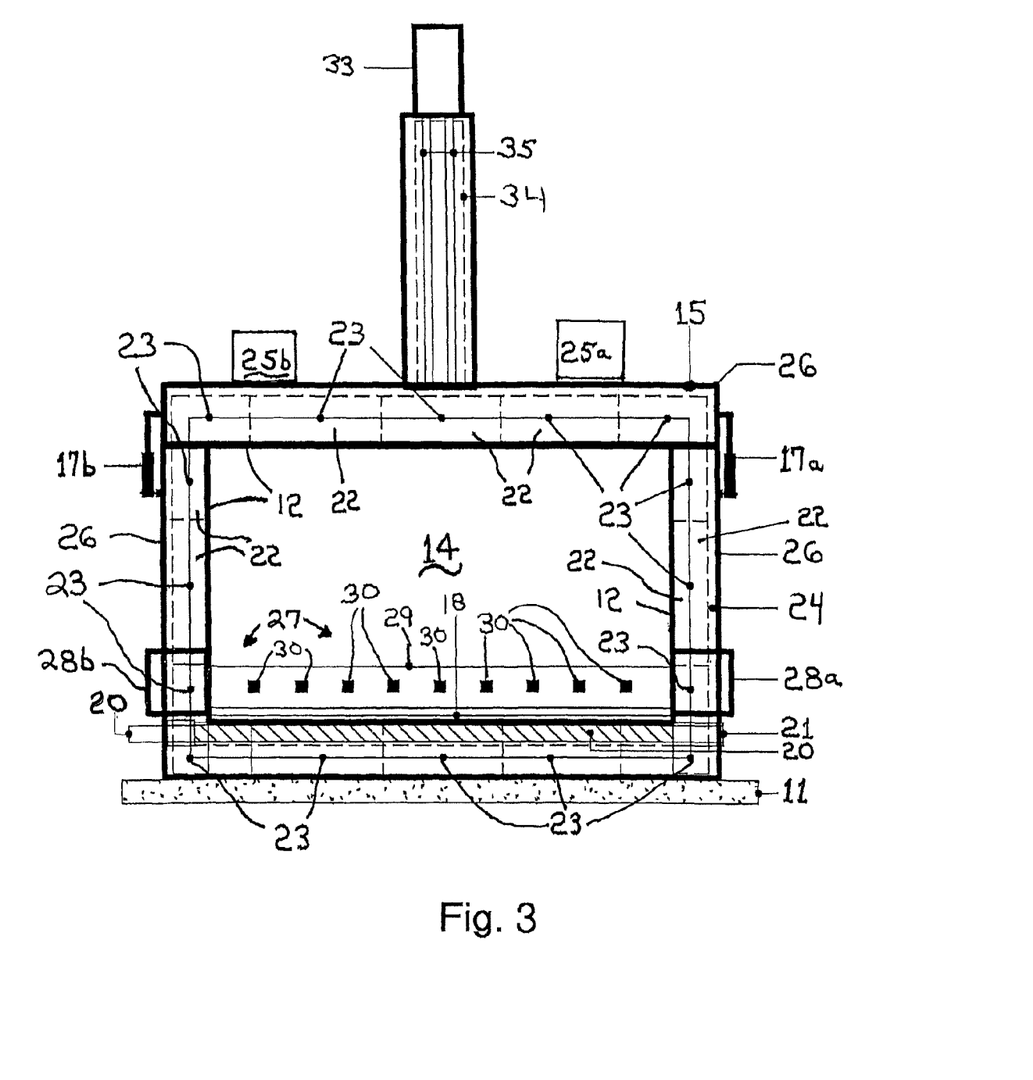
FIG. 3 shows a front elevational schematic view of an example of a suitable hydronic unit.
Figure 4:
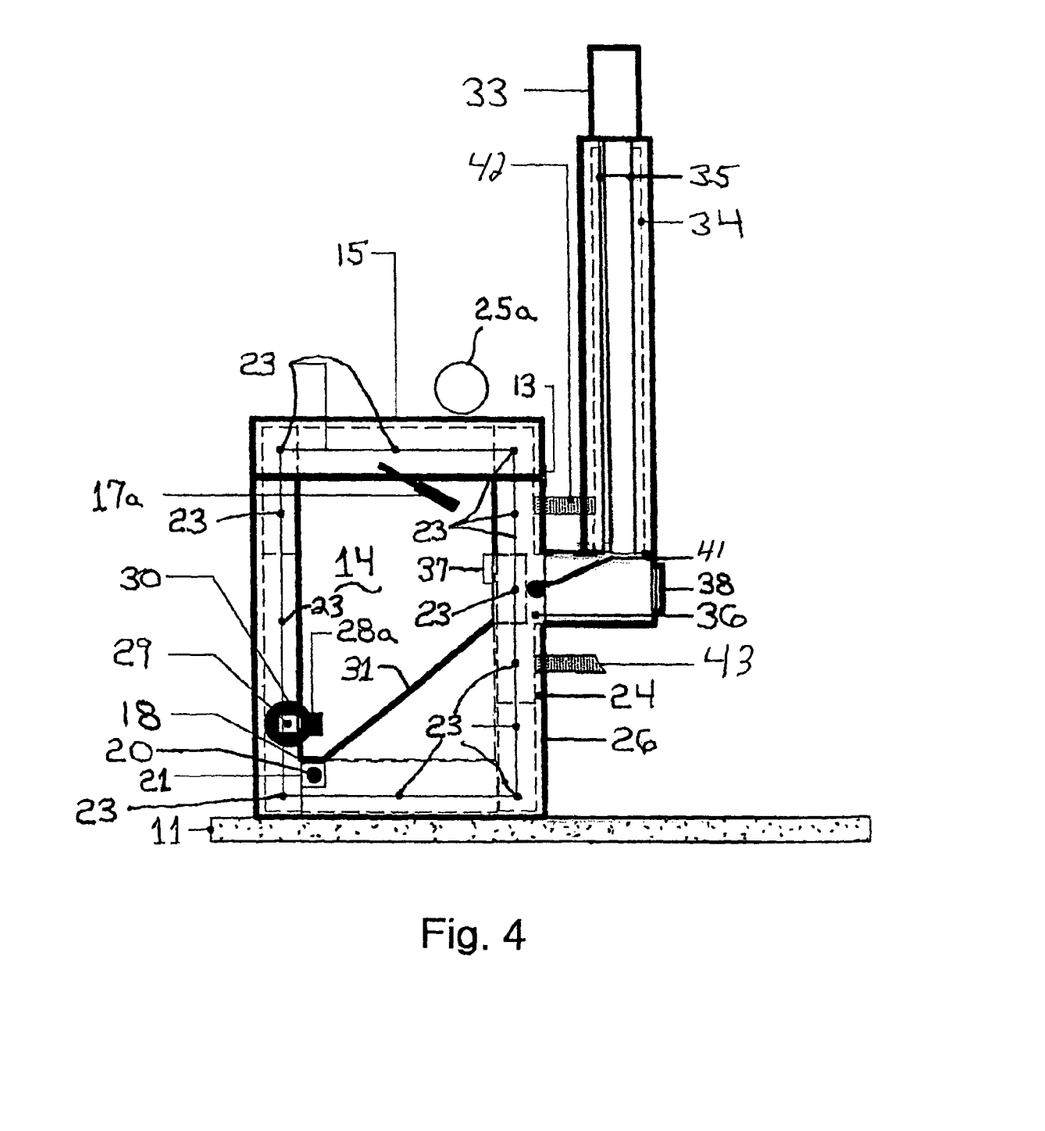
FIG. 4 shows a right side schematic view of the hydronic unit of FIG. 3.
Figure 5:
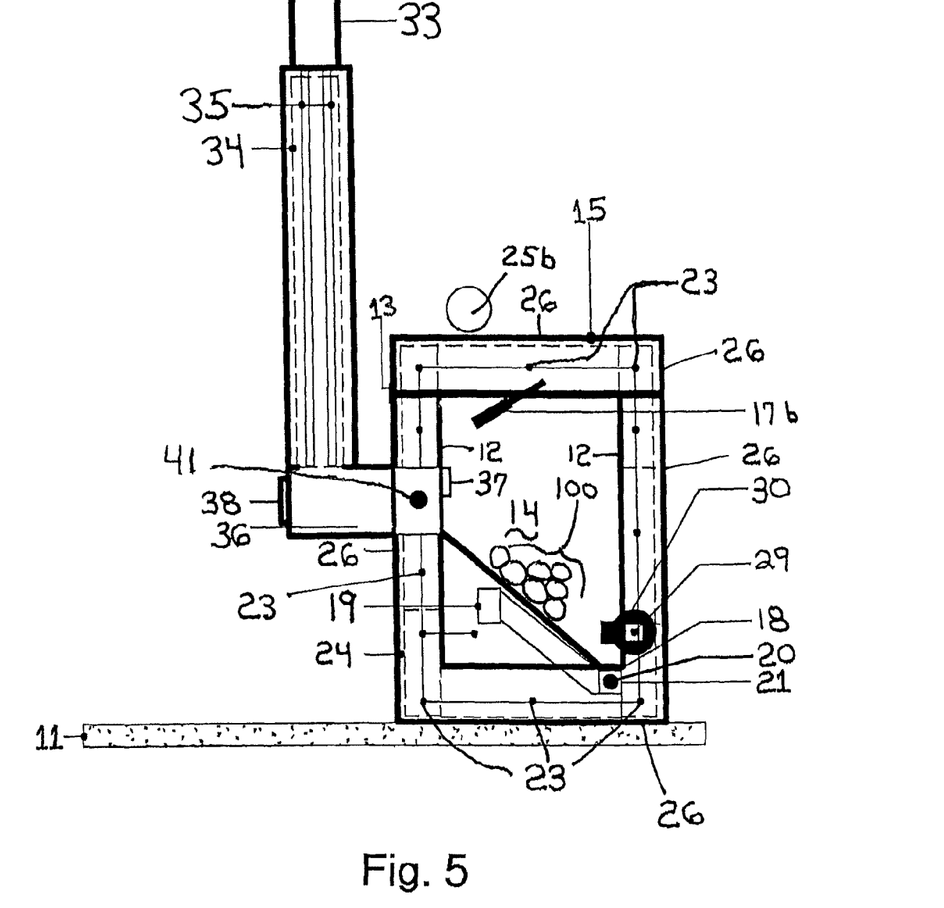
FIG. 5 shows a left side schematic view of the hydronic unit of FIG. 3.
Figure 6:
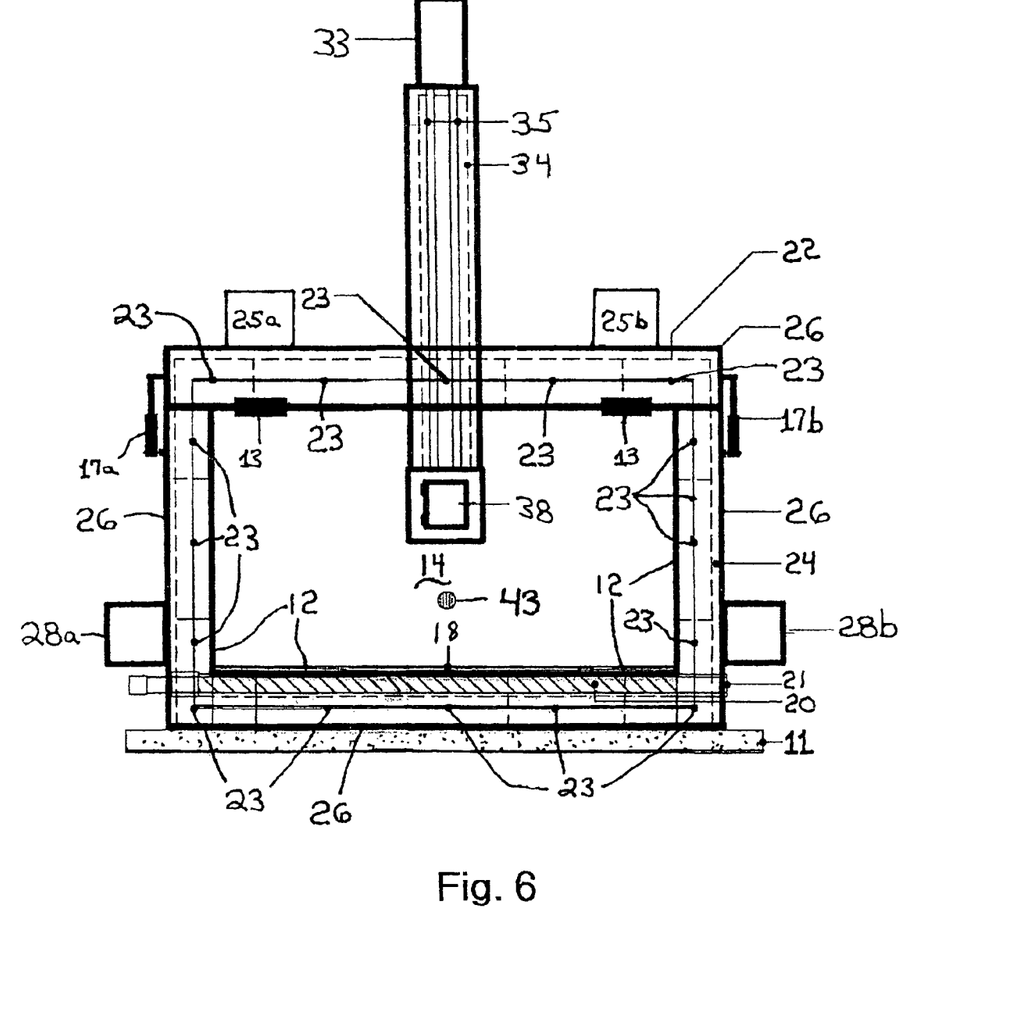
FIG. 6 a left side schematic view of the hydronic unit of FIG. 3.

With reference to FIGS. 1 and 2, a schematic diagram is presented showing a system 10 for non-fractionalized biomass-fueled, refrigerant-based cogeneration. System 10 generates useful alternating current electricity and provides for the recovery and exploitation of surplus thermal energy. A substantial portion of the BTU value of biomass fuel 100, which is preferably non-fractionalized, virgin (i.e. not painted, stained, lacquered or treated with preservatives or other foreign chemicals) solid wood and/or another suitable biomass resource, which can be, but need not be, fractionalized into chips, sawdust or other small physical units and which need not necessarily be of uniform shape or moisture content, undergoes combustion in a hydronic unit 102 to heat water which serves as a heat transfer medium to supply heat for driving an organic Rankine cycle as will be described in further detail below. Water is preferred over heat transfer oil for this purpose because it is nonflammable, plentiful, low in cost and can be disposed of at low cost and without harm to the environment.

Referring additionally to FIGS. 3, 4, 5 and 6, a suitable hydronic unit 102, will now be described in further detail. In a preferred embodiment, the hydronic unit 102 may measure approximately eight feet high by about ten feet wide by about fourteen feet long (about 8' (H)×10' (W)×14' (L)) in overall size. Hydronic unit contains a burn box 12 within which combustion of biomass fuel 100 takes place. In the preferred embodiment, burn box 12 is installed on a concrete slab 11 and has an open, interior cavity 14 within which combustion of biomass fuel takes place. In a preferred embodiment interior cavity 14 measures approximately six feet high by about four feet wide by about ten feet long (about 6' (H)×4' (W)×10' (L)) and has walls 16 formed of one half inch (½") thick carbon steel. The burn box 12 has sloped bottom 31 and has a lid 15 which is secured by a hinge 13 and may be selectively opened with the aid of a pair of hydraulic cylinders 17a, 17b for charging the burn box with biomass fuel 100. Disposed at the lower end of sloped bottom 31, burn box 12 also has a bottom grate 18 though which ash may fall into an ash discharge drop pipe 19 for removal via a powered auger 20 which rotates within a channel 21.

The entire perimeter of the burn box 12, including the hydraulically opening lid 15 is surrounded by water walled, low pressure (preferably <15 psi), baffled, water jackets 22 which are interconnected with one another by way of pipes 23 and are surrounded by a layer of foam insulation 24. The foam insulation 24 is in turn surrounded by an exterior protective metal housing 26. The hydronic unit 102 is controlled by a Programmable Logic Controller and features two (2 each) pumps 25a, 25b, each having a rated capacity of one hundred fifty gallons per minute (150 gpm) for circulating heated water. Pumps 25a, 25b are independently controllable and may be operate individually and/or in tandem, either in series or in parallel.

Combustion of the biomass fuel 100 is aided by an air induction system 27 which includes a pair of blowers 28a, 28b, each of which is coupled to a forced air induction chamber 29 which communicates with the interior 14 of burn box 12 via a plurality of openings 30 to supply combustion air under pressure thereto.

For discharge of combustion emissions, hydronic unit 102 includes an exhaust stack 33 within which one or more emission pipes 35 are routed for discharge to atmosphere, either directly or by way of suitable emissions reduction systems, such as electrostatic or water spray particulate capture systems and/or carbon dioxide scrubbers or the like (not shown). For improved efficiency, the emission pipes 35 of the exhaust stack 33 are surrounded by a stack water jacket 34 which serves to scavenge heat from the exhaust gasses liberated due to combustion of the biomass fuel 100. Stack 33 communicates with the interior 14 of burn box 12 by way of an emissions exhaust chamber 36 which is fitted with an exhaust vent 37 and a clean-out door 38.

Water to be heated enters hydronic unit 102 by way of an inlet 41 (shown in FIG. 5) that is coupled to the water jackets 22 which surround the burn box 12. Hot water is discharged from hydronic unit 12 by way of a hot water outlet 43 (shown in FIG. 6). To extract heat from the exhaust stack 33, water is circulated between the water jackets 22 and the stack water jackets 34 during operation.

The programmable logic controller (not shown) controls pumps 25a, 25b to provide sufficient flow that the water exiting the hot water output 43 does not exceed a maximum of about two hundred fifty degrees Fahrenheit (250° F.). Nominal normal operating temperature of the water exiting the hot water output 43 of the hydronic unit 102 is approximately two hundred thirty degrees Fahrenheit (230° F.). For safety, the hydronic unit 102 should be pressure tested successfully to at least thirty five pounds per square inch (35 psi) and should be fitted with fitted with twin fifteen pound per square inch (15 psi) pressure relief valves (not shown). In the event the system 10 loses power, excess pressure is vented as steam via the pressure relief valves and cooler water is introduced to prevent damage which could otherwise be caused by overheating of the burn box 12. In addition, during a power outage the air induction blowers 28a and 28b cease to function thereby depriving system 10 of oxygen and thus, automatically restricting combustion. As a further safety feature, when hydraulic cylinders 17 are actuated in order to open lid 15 in order to charge hydronic unit 102 with biomass fuel 100 the programmable logic controller automatically ensures that both of the 1,200 cfm air induction blowers 28a, 28b are deenergized before the lid 15 opens in order to throttle down the combustion rate, thereby protecting users from blasts of excessively hot gases. The opening time cycle of the lid 15 is approximately twenty-two seconds (22 seconds). Lid 15 pivots approximately sixty degrees (60°) about hinges when fully open as to permit the easy loading of clean/virgin waste wood biomass fuel 100.

In normal operation of hydronic unit 12, combustion of non-fractionalized clean, virgin waste wood biomass fuel 100 is carried out in the burn box 12 to heat the water in the stack water jackets 34 as well as the water jackets 22 which surround burn box 12. With the aid of one or both pumps 25a, 25b, hot water at a temperature within a range of about one hundred ninety five degrees Fahrenheit (195° F.) to about two hundred thirty degrees Fahrenheit (230° F.) is discharged from hot water outlet 43 and delivered to an expansion heat exchanger 106 as shown in FIG. 1. In expansion heat exchanger 106, the heated water expands the refrigerant into pressurized vapor before being returned to the water inlet 41 of hydronic unit 102. In normal operation, the water discharged from hot water outlet 43 is approximately twenty-five degrees Fahrenheit (25° F.) warmer than the water entering water inlet 41.

The hot water generated by the hydronic unit 12 may be pressurized to generally less than about 15 pounds per square inch (psi) and thus may be exempted from Federal/State Boiler Safety laws. In addition, the hydronic unit 102 may also be substantially non-pressurized (i.e., operating at substantially atmospheric pressure), depending upon the operating temperature(s) for which system 10 is designed. Such hot water temperature, preferably ranging from about one hundred ninety five degrees Fahrenheit (195° F.) to about two hundred fifty degrees Fahrenheit (250° F.), may be specified based on consideration of local conditions such as local ambient temperature, site elevation (affecting the boiling point of water), the particular refrigerant used as well as other site parameters, among which, local climate characteristics may be of particular guidance.

The hot water from outlet 43, whose flow rate may suitably be in the range about 150 gallons per minute (gpm) per 50 to 100 kilowatts (kW) of electrical power generated, is delivered by pumps 25a, 25b to a refrigerant expansion heat exchanger 106 which forms part of a waste heat generator 46, which may suitably comprise a modular, heat-to-power generation unit of the type available from ElectraTherm Inc. of Carson City, Nev., under the brand name Green Machine™ The expansion heat exchanger 106 is connected in a refrigerant loop 48 in which an organic Rankine cycle 50 is carried out. Water discharged from expansion heat exchanger 106 is recycled by way of hot water return 42 to the water inlet 41 of the hydronic unit 102.

In the organic Rankine cycle 50, liquid organic refrigerant 130 from a refrigerant storage vessel 126 is pumped by one or more pumps 128 which cause a refrigerant to become pressurized liquid refrigerant 52. Although other organic refrigerants may be used, the presently preferred refrigerant is the non-flammable, environmentally-friendly type R245FA available from Honeywell International, Inc. under its registered trademark Genertron®. Hot water entering the expansion heat exchanger 106 causes pressurized liquid refrigerant 52 to boil. Pressurized refrigerant vapor 54 is delivered to a positive displacement mechanical device 108 which may suitably comprise a turbine, microturbine, gerotor, screw expander and/or other positive displacement mechanical device in which the vaporized refrigerant 54 expands, decreases substantially in pressure in order to generate mechanical energy as indicated at reference numeral 109. The positive displacement mechanical device 108 is mechanically coupled, as indicated at reference numeral 56, either directly, or indirectly by way of an interposed clutch, gear train and/or brake (not shown). Positive displacement mechanical device 108 is in turn mechanically coupled, either directly, or by way of an interposed clutch, gear train and/or brake (not shown), to an electrical generator 110 which can be a single phase a.c. electrical generator 110 but may also suitably comprise a three phase a.c. electrical generator 110' or other suitable electricity generating devices and equipment 110" to produce electricity 112 for on-site use, peak shaving, base load, and/or distributed power 114 for export to a utility grid 115 via a suitable switching and protective circuit 116 of a type well known in the art.

Returning to consideration of the organic Rankine cycle, refrigerant vapor 123 discharged from the positive displacement mechanical device 108 is applied to a condensing heat exchanger 123 which condenses the refrigerant vapor back into liquid refrigerant 124 to complete the cycle. The liquid refrigerant is returned to refrigerant storage vessel 126 as indicated in FIG. 1. During normal operation of system 10, the organic Rankine cycle 50 runs continuously.

If desired, an extraction well 118 and down-well pump 120 may optionally be deployed to provide the cooling water necessary to the condensing heat exchanger 122, thus exploiting the cooler geothermal properties of the Earth's underground water supply in order to assist the condensing of the refrigerant back into a liquid state. Flow rates of water extracted from such an extraction well 118 may range from about one hundred fifty gallons per minute (150 gpm) per 50 kilowatt to 100 kilowatt of electricity generated with such flow ranging in pressure between about thirty five pounds per square inch (about 35 psi) to about seventy pounds per square inch (about 70 psi).

While being pumped through condensing heat exchanger 122 by pump 120, the condensing water 131 picks up heat and increases in temperature. As indicated in FIG. 2 at 132, at least a portion of such heat may be extracted from the condensing water for use for any useful purpose including without limitation such uses as drying biomass feed stock or other materials, hydroponic agricultural use, greenhouse, commercial or residential heating, clothes drying, water heating, water preheating, and/or other heating applications. After whatever remedial treatment, if any, which might be needed depending on the use made of the cooling water in order to restore the water to appropriate standards, the cooling water may be discharged into a terrestrial body of water or injected into the earth via an injection well.

An injection well 134 may be deployed to return condensing water 132 back to the earth 136. Where there may exist higher extraction (supply) static water level elevation(s) than those situated at the site of injection (return/discharge) of such condensing water, micro hydro generator(s) may be deployed to provide additional electricity, thereby reducing the parasitic load on system 10 and thus improving the overall efficiency of system 10.

Cooling towers (not shown) may also be deployed, either alone or combined with cool water heat trimming from public water supplies and/or underground geothermal cool water. Likewise, condensing may be facilitated from air-cooling in certain geographically located areas where ambient air temperatures permit, as well as from other potential sources 116.

Figure 7:
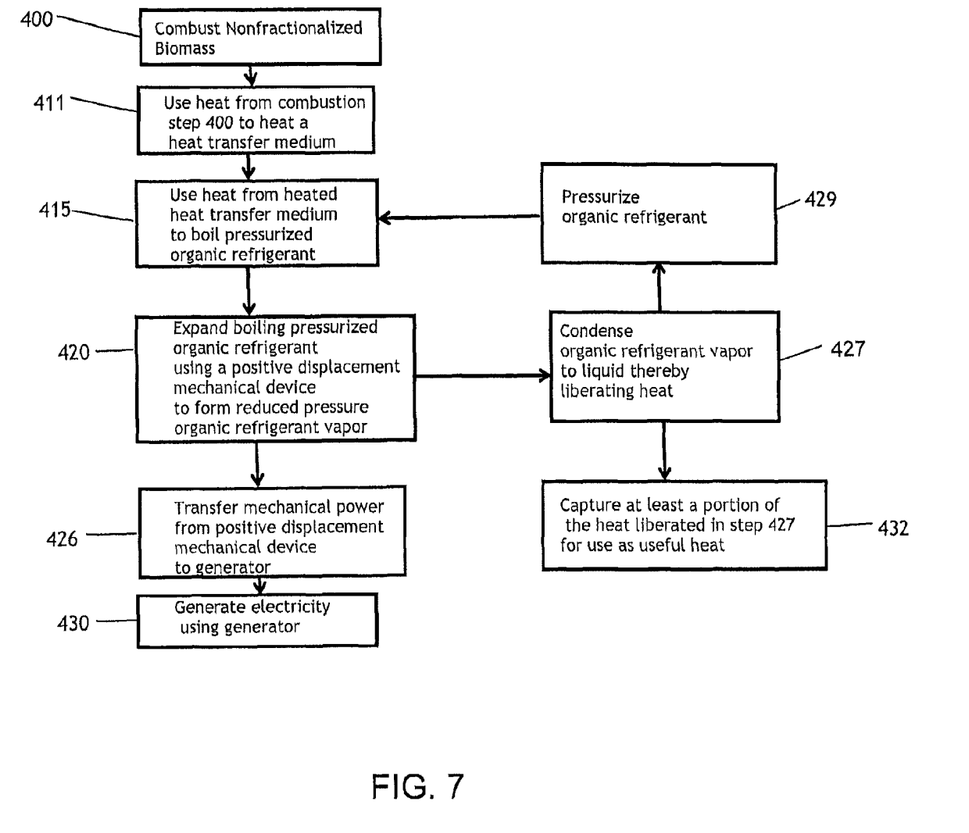
FIG. 7 shows a flowchart of cogeneration in accordance with an embodiment of the present invention.

With reference to FIG. 7. a flowchart for non-fractionalized biomass-fueled refrigerant-based cogeneration method 9 is presented. At 400, virgin solid biomass, or other non-fractionalized biomass, either optionally enriched with petroleum or not, undergoes combustion. By way of non-limiting example, combustion may be carried out in the burn box of a hydronic unit 102. The burn box 102 may be fueled with any suitable non-fractionalized biomass resource such as slash bundles, logs, limbs, tree stumps, scrap lumber, and/or combinations or subcombinations thereof depending on availability. At 411, heat from the combustion step is transferred to a fluid heat transfer medium which may be heat transfer oil but is preferably liquid water at a pressure which preferably does not exceed about fifteen pounds per square inch (about 15 psi). This heat transfer medium, may by way of nonlimiting example, be water circulating through the water jackets 22 and 34 of hydronic unit 102. At step 415, heat from the heated heat transfer medium of step 411 is used to boil a pressurized organic refrigerant. By way of nonlimiting example, this pressurized organic refrigerant may suitably be the liquid refrigerant 52 pressurized by pump 128 of the waste heat generator 46 described above in connection with FIG. 1. At step 420, the boiling pressurized organic refrigerant is expanded and used by a positive displacement mechanical device to form reduced pressure organic refrigerant vapor. By way of nonlimiting example the positive displacement mechanical device may suitably be a turbine, screw expander, and/or a gerotor. It will be recognized that steps 415 and 420 form part of a closed loop organic Rankine cycle 50 which continues at step 427 with the condensing of the organic refrigerant vapor from step 420 to liquid thereby liberating heat. Closed loop organic Rankine cycle 50 further continues with a step 429 of pressurizing the organic refrigerant from step 427. Pressurized organic refrigerant from step 429 may then be recirculated for use in step 415 as described above.

At step 426 mechanical power produced from the expansion of the boiling pressurized organic refrigerant in step 420 is transferred from the positive displacement mechanical device of step 420 to an electrical generator, which has indicated at step 430 generates useful electricity. Concomitantly, at least a portion of the heat liberated in step 427 may be captured for use as useful heat which can be used for any of the useful purposes pointed out above or any other useful purpose.

While the invention has been described with reference to preferred embodiments, it will be understood by those skilled in the art that various changes may be made and/or equivalents substituted for elements of such embodiments without departing from the scope of the invention. In addition, modifications may be made to adapt the teachings of the invention to a particular situation without departing from the essential scope of the invention. Therefore, it is intended that the invention not be limited to the particular embodiments disclosed herein. Rather, the invention encompasses all embodiments falling within the scope of the appended claims either literally or under the Doctrine of Equivalents.

What is claimed is:

1. A method for cogeneration of electricity and useful heat using biomass comprising the steps of:
  combusting the biomass to produce heat, wherein said biomass does not require processing;
  heating a heat transfer fluid using said heat from said combusting step;
  carrying out an organic Rankine Cycle by:
    (i) pressurizing a liquid organic refrigerant;
    (ii) vaporizing said organic refrigerant using heat from said heat transfer fluid;
    (iii) harnessing mechanical power from said organic refrigerant using a positive displacement mechanical device; and
    (iv) condensing said organic refrigerant to a liquid state thereby liberating heat;
    (v) transferring at least a portion of said mechanical power to a generator;
    (vi) generating electricity using said generator; and
    (vii) capturing as useful heat, said useful heat comprising at least a portion of said heat liberated in said condensing substep of said organic Rankine Cycle; and
  wherein said combusting step and said heating step are carried out in a combustion unit, the combustion unit comprising:
    a water jacket surrounding a burn box and in thermal communication with the heat transfer fluid;
    biomass grates configured to support the biomass; and
    augers comprising ash trays configured to remove ash from the combustion unit; and
    wherein the biomass grates and augers are in thermal communication with the water jacket.

2. The method of claim 1 further comprising the step of enriching said biomass fuel with petroleum-based combustibles recovered from oil well spillages, bio-based petroleum recovery absorbents, or biomass contaminated by oil spillage for the purposes of providing an environmental remediation solution and enhancing cogeneration.

3. The method of claim 1 wherein said biomass fuel comprises woody and non-woody biomass.

4. The method of claim 1 wherein said heat transfer medium comprises water.

5. The method of claim 1 wherein said combustion step and said heating step are carried out in a combustion unit having an ash removal system.

6. The method of claim 1 wherein said condensing substep of said organic Rankine Cycle is carried out with the aid of cooling water from a well.

7. The method of claim 1 wherein said biomass comprises:
  (i) crude, unrefined, and non-homogenous wood,
  (ii) wood having no uniformity,
  (iii) diverse sizes, shapes, moisture contents, varieties, and species of wood,
  (iv) wasted, unused, or nonmerchantable biomass remaining after timbering and logging operations,
  (v) slash bundles wherein slash bundles are defined as bundled biomass containing a mix of forestry residue including limbs, tops, leaves, needles, partially rotted limbs and other biomass residues,
  (vi) waste biomass resulting from land clearing, arborist activities, road right-of-way and power line tree pruning and removal,
  (vii) biomass subject to silviculture or forestry practices having no merchantable value,
  (viii) biomass subject to open burning,
  (ix) biomass subject to prescribed burns,
  (x) biomass subject to air curtain incineration,
  (xi) biomass subject to land filling, or
  (xii) processed biomass.

8. A system for the cogeneration of electricity and useful heat, said system comprising:
  a unit for combusting biomass in thermal proximity of a heat transfer medium;
  an organic Rankine Cycle heat generator thermally coupled to said unit by way of said heat transfer medium, said organic Rankine Cycle heat generator having (i) a pump for pressurizing liquid organic refrigerant, (ii) a heat exchanger coupled to said pump for vaporizing said organic refrigerant in thermal proximity of said heat transfer medium, (iii) a positive displacement mechanical device coupled to said heat exchanger for generating mechanical power using said organic refrigerant, and (iv) a condensing heat exchanger coupled to said positive displacement mechanical device to liberate heat and to capture at least a portion of said heat for a useful purpose;
  a generator mechanically coupled to said positive displacement mechanical device for generating electricity; and
  wherein the unit for combusting biomass comprises:
    a water jacket surrounding a burn box and in thermal communication with the heat transfer fluid;
    biomass grates configured to support the biomass; and
    augers comprising ash trays configured to remove ash from the combustion unit; and
    wherein the biomass grates and augers are in thermal communication with the water jacket.

9. The system of claim 8 wherein said heat transfer medium comprises water.

10. The system of claim 8 wherein said biomass comprises any non-woody biomass.

11. The system of claim 8 further comprising a well coupled to said condensing heat exchanger for supplying cold water to condense said organic refrigerant.

12. The system of claim 8 wherein said biomass comprises:
  (i) crude, unrefined, and non-homogenous wood,
  (ii) wood having no uniformity,
  (iii) diverse sizes, shapes, moisture contents, varieties, and species of wood,
  (iv) wasted, unused, or nonmerchantable biomass remaining after timbering and logging operations,
  (v) slash bundles wherein slash bundles are defined as bundled biomass containing a mix of forestry residue including limbs, tops, leaves, needles, partially rotted limbs and other biomass residues,
  (vi) waste biomass resulting from land clearing, arborist activities, road right-of-way and power line tree pruning and removal,
  (vii) biomass subject to silviculture or forestry practices having no merchantable value,
  (viii) biomass subject to open burning,
  (ix) biomass subject to prescribed burns,
  (x) biomass subject to air curtain incineration,
  (xi) biomass subject to land filling, or
  (xii) processed biomass.

* * * * *